United States Patent [19]

Horn et al.

[11] 4,205,569
[45] Jun. 3, 1980

[54] TUBE CUTTING APPARATUS

[75] Inventors: Charles F. Horn, Dayton; Edward F. Fowle, Springfield; Wayne L. Poling, Dayton, all of Ohio

[73] Assignee: The Vulcan Tool Company, Dayton, Ohio

[21] Appl. No.: 850,097

[22] Filed: Nov. 10, 1977

[51] Int. Cl.$^2$ .............................................. B23D 21/02
[52] U.S. Cl. ........................................... 83/82; 83/157; 83/183; 83/188; 83/198
[58] Field of Search ............. 83/54, 82, 157, 178–195, 83/198

[56] References Cited

U.S. PATENT DOCUMENTS

| | | | |
|---|---|---|---|
| 2,701,014 | 2/1955 | Daukus | 83/190 |
| 2,855,627 | 10/1958 | Prentiss | 83/198 X |
| 3,060,774 | 10/1962 | Warkoczewski | 83/198 X |
| 3,374,697 | 3/1968 | Robinson | 83/192 X |
| 3,756,108 | 9/1973 | Fuchs, Jr. | 83/193 |
| 3,956,953 | 5/1976 | Lindell | 83/188 |
| 3,972,257 | 8/1976 | Lazar | 83/198 |
| 4,128,027 | 12/1978 | Fuchs | 83/198 |

FOREIGN PATENT DOCUMENTS 1527069 6/1969 Fed. Rep. of Germany ............ 83/198

Primary Examiner—J. M. Meister
Attorney, Agent, or Firm—Jerome P. Bloom

[57] ABSTRACT

High speed tube cutting apparatus provides die means for the simultaneous cutting of a plurality of tube segments from a length of tubing. Preferred embodiments are capable of cutting the tube segments in extremely short lengths and with the ends thereof formed on a bias. The improvements of the invention eliminate waste and enable the shearing of the tube segments to be achieved in a single stroke of the included die means. A further feature of the invention apparatus is that it provides means for precisely realigning sheared tube segments with the tubing from which they have been cut to facilitate their ejection under the influence of the advancement of such tubing.

17 Claims, 12 Drawing Figures

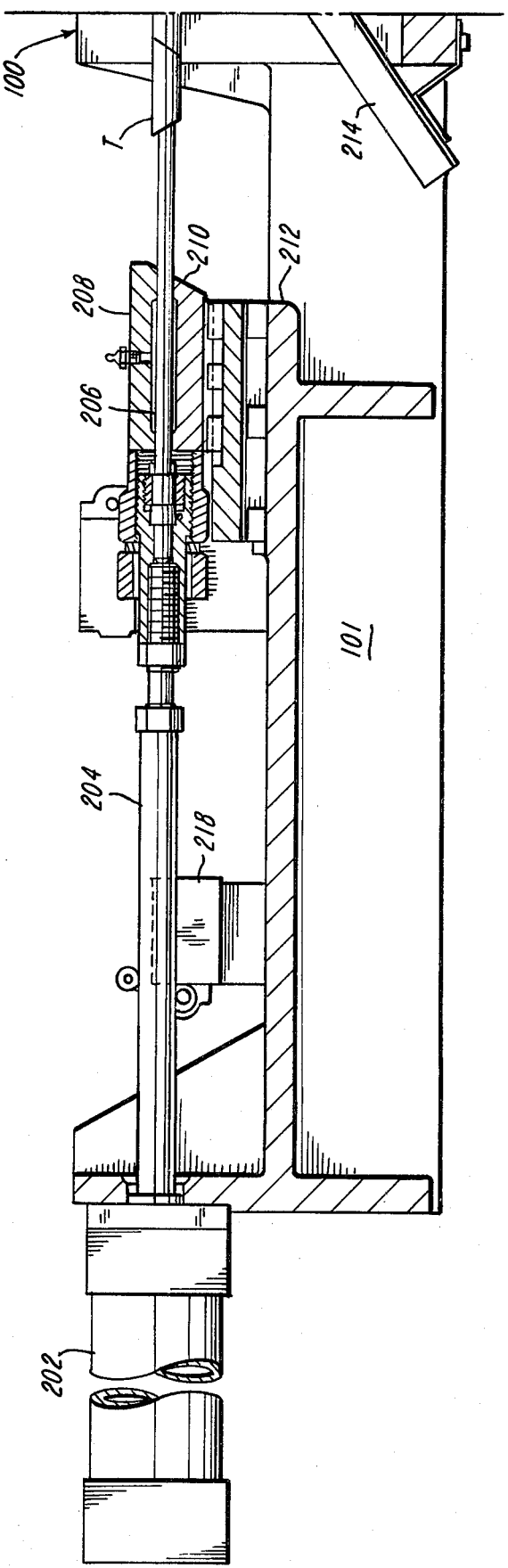

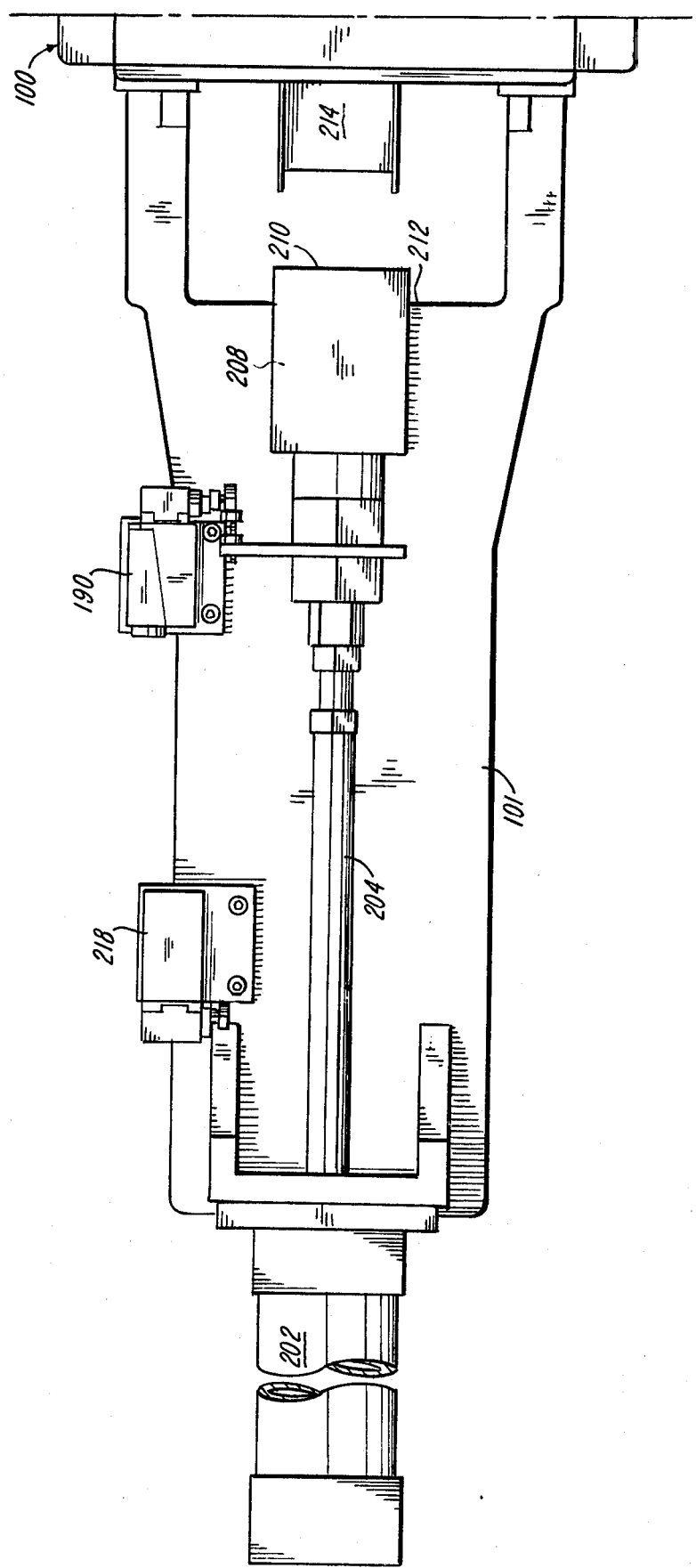

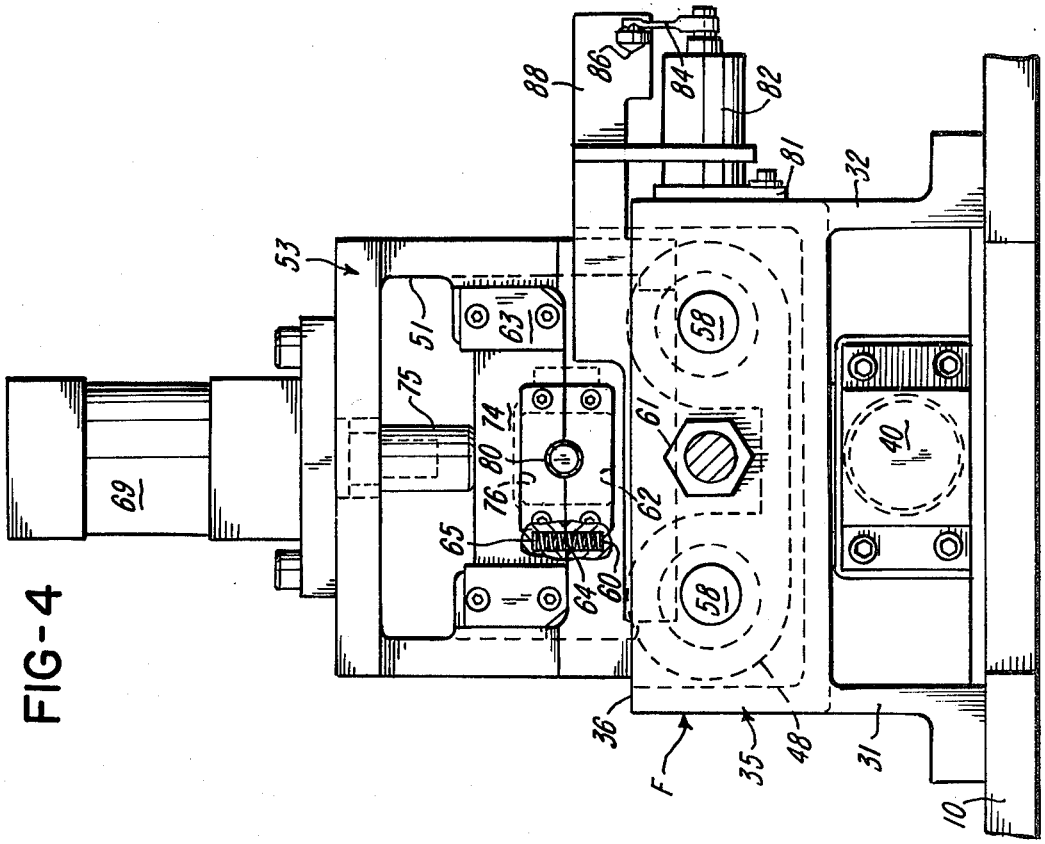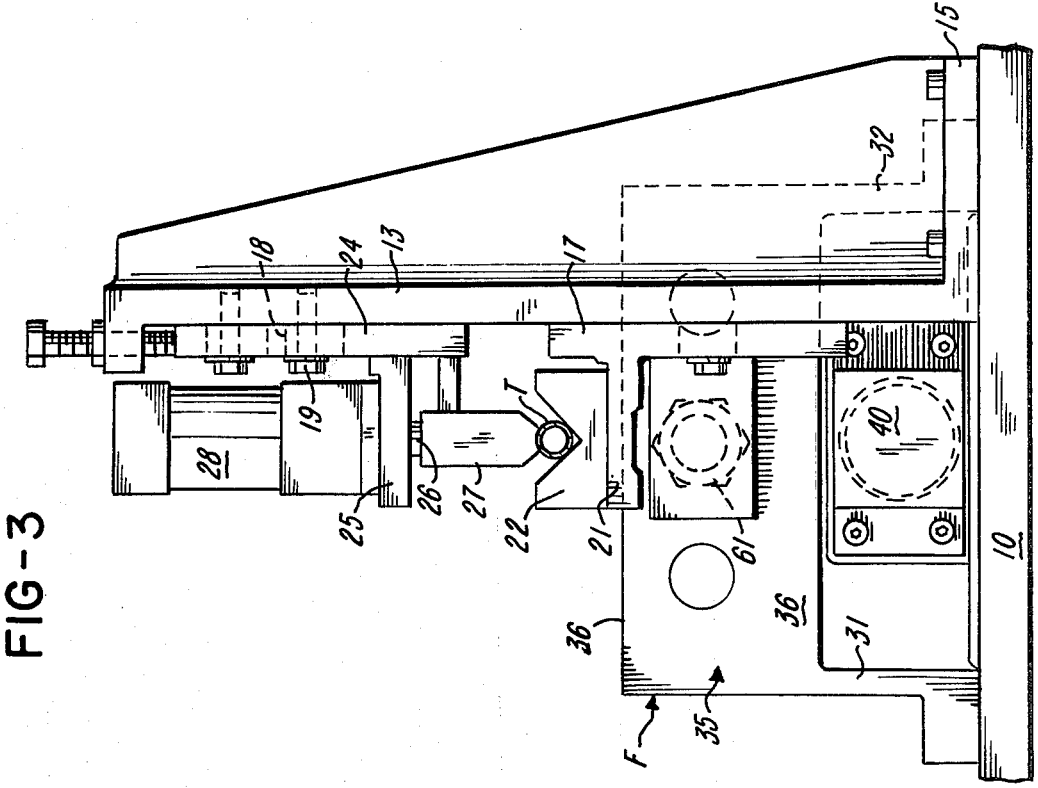

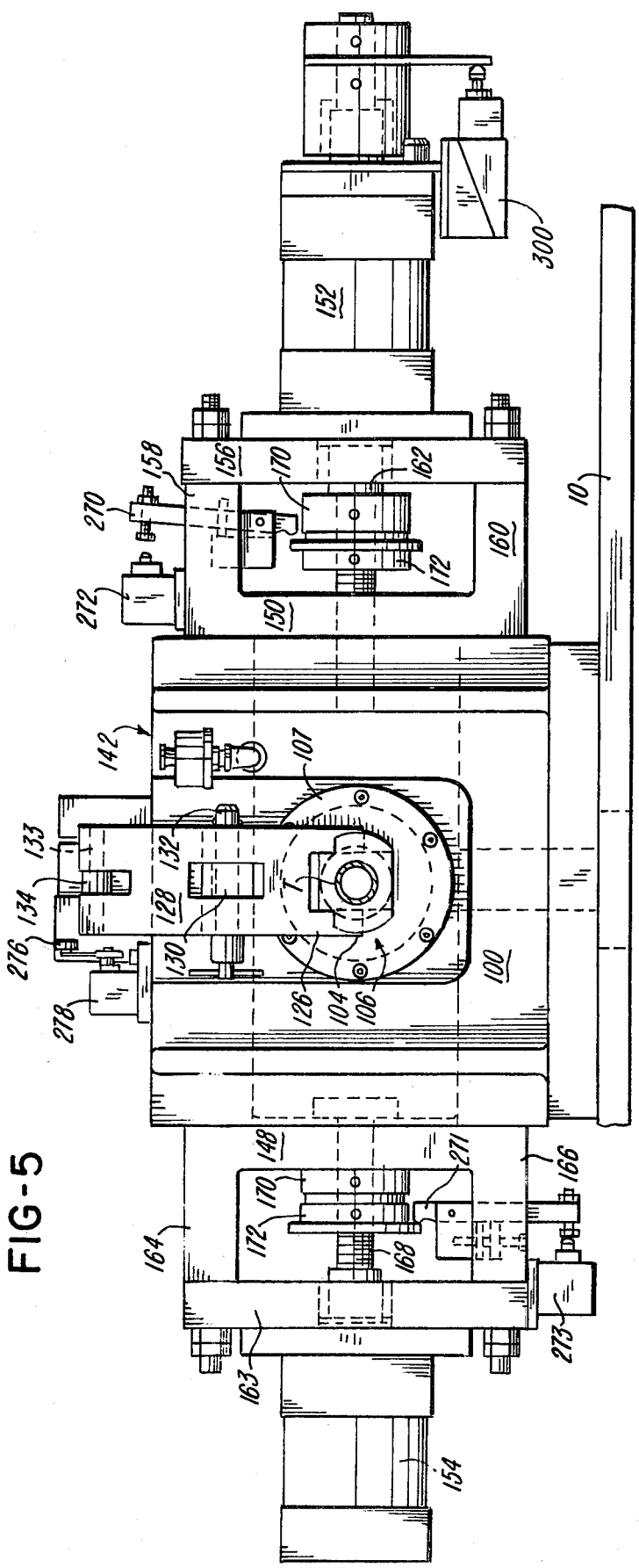

TUBE CUTTING APPARATUS

BACKGROUND OF THE INVENTION

This invention relates to tube cutting apparatus capable of simultaneously cutting multiple segments from a continuous length of tubing in a high speed shearing operation. Embodiments feature a superior ability to economically produce ring or cylindrically shaped tube segments of short length the ends of which are cut in planes angularly inclined to their longitudinal axis.

The high speed and economical production of tube segments of ring or cylindrical shape is well known in the prior art but only in respect to those segments the ends of which are cut essentially at right angles to their longitudinal axis. Typical of conventional apparatus applied to such purpose is that exemplified in the Brehm U.S. Pat. Nos. 2,837,156 and the Shields U.S. Pat. No. 4,003,278, the latter of which carries forward, to some extent, the invention of the Brehm patent. The "Brehm" tube cutter includes a cutting station to which a continuous length of tubing may be fed and there contained by cutting dies the movement of one of which relative the other, in two senses one of which is at right angles to the other, produces two cuts and a single shearing operation, by virtue of which a single segment of the tubing is cut from its advancing end. The segment so cut will have a ring cylindrical shape and "squared" ends.

Many efforts have been made to automate the "Brehm" type cutter and increase its production capability or expand the field of its application. However, heretofore no one has produced improvements which have enabled the simultaneous cutting of multiple tube segments therein, let alone tube segments the respective ends of which have been successfully and economically cut on a bias.

It is not that it has not been known heretofore to produce tube segments the ends of which have been cut on the bias but that were such tube segments have been fabricated, they have been produced in a relatively inefficient manner which has been particularly wasteful of the tubing material and relatively slow from a production standpoint. Conventionally the tube segments having inclined ends have been cut one by one, using a saw. The structure employed inherently dictates that there is a loss of material on each cut, which loss is at least equal to the thickness of the saw blade employed. Apart from this, the sawing procedure has often left the tube segments so cut with sharp and dangerous edge portions. This means that the tube segments so fabricated must at one point or another be further processed to remove these sharp edge portions prior to their use as end products, in one form or another.

It was to the solution of those problems above noted in the tube cutting art that the efforts which resulted in the present invention were directed.

It is believed that the disclosures of the above noted prior art patents are generally representative of the present level of knowledge of the prior art most pertinent to the present invention.

SUMMARY OF THE INVENTION

The present invention affords improvements in the art of tube cutting and provides tube cutting apparatus which is versatile in application, efficient and satisfactory in use and capable, in preferred embodiment, of producing ring or cylindrically shaped tube segments in a high speed shearing operation the ends of which are cut on a bias. A basic feature of tube cutting apparatus per the present invention is the ability to cut multiple tube segments in a single shearing operation. This is illustrated herein in exemplary fashion by apparatus including pairs of cutting dies which orient and operate so as to simultaneously sever applied tubing at longitudinally spaced locations in a single shearing stroke. The cutting surfaces of these dies define inclined planes enabling cuts to be made in the tubing which are on a bias and in a non-parallel relation to one another, enabling thereby that the end product is a relatively finished article the respective ends of which define planes which are symmetrically inclined to each other.

As herein disclosed, to achieve the end products continuous tubing may be fed to the cutting station of the invention apparatus in increments each of which is equal to a multiple of the desired length of the tube segment to be cut. This is basic to the achievement of multiple segments in each stroke of the cutting dies, which move through the cutting station in a high speed shearing operation with each incremental advance of the continuous tubing.

In the embodiment illustrated, the cutting dies mount to slide means which control their travel in a manner to insure that subsequent to their separation from the continuous tubing the cut tube segments are placed in direct alignment with the advancing end of the tubing so that in the process of the movement of this advancing end to the cutting station the cut segments are easily and positively ejected.

Basically embodiments of the present invention capture the general principles of the "Brehm" type machine and provide improvements thereon and a scope of application not available in use of the "Brehm" cutter.

It is accordingly a primary object of the invention to provide a new and improved tube cutting apparatus capable of a high speed production cutting of small tube segments the ends of which are cut on a bias.

Another object is to provide improvements in tube cutters enabling plural tube segments to be simultaneously cut in a single shearing stroke, thereby to increase the speed of operation of such cutters.

An additional object of the invention is to provide means for the simultaneous cutting of plural tube segments from a length of continuous tubing which precisely realigns the cut segments with the continuous tubing as the tubing is advanced for a further cutting operation, thereby to insure a trouble free ejection of the cut segments from the cutting station.

Another object of the invention is to provide simple and effective means for a high speed production of tube segments ends of which are cut to be angularly inclined to their longitudinal axis.

A further object is to provide carrier means for movable die means comprising means for shearing simultaneously a plurality of tube segments from a length of continuous tubing without waste of the tube material and in a single stroke of the die means.

An additional object of the invention is to provide tube cutting apparatus possessing the advantageous structural features, the inherent meritorious characteristics and the means and mode of use herein described.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawing wherein is shown one but obviously not necessarily the only form of embodiment of the invention, FIGS. 1A and 1B mutually define a longitudinally extending vertical section of apparatus in accordance with the present invention;

FIGS. 2A and 2B mutually define a top plan view of the apparatus of FIGS. 1A and 1B;

FIG. 3 is a view taken on line 3—3 of FIG. 2A;

FIG. 4 is a view taken on line 4—4 of FIG. 2A;

FIG. 5 is a view taken on line 5—5 of FIG. 2A;

Like parts are indicated by similar characters of reference throughout the several views.

Like parts are indicated by similar characters of reference throughout the several views.

Figure 1A:
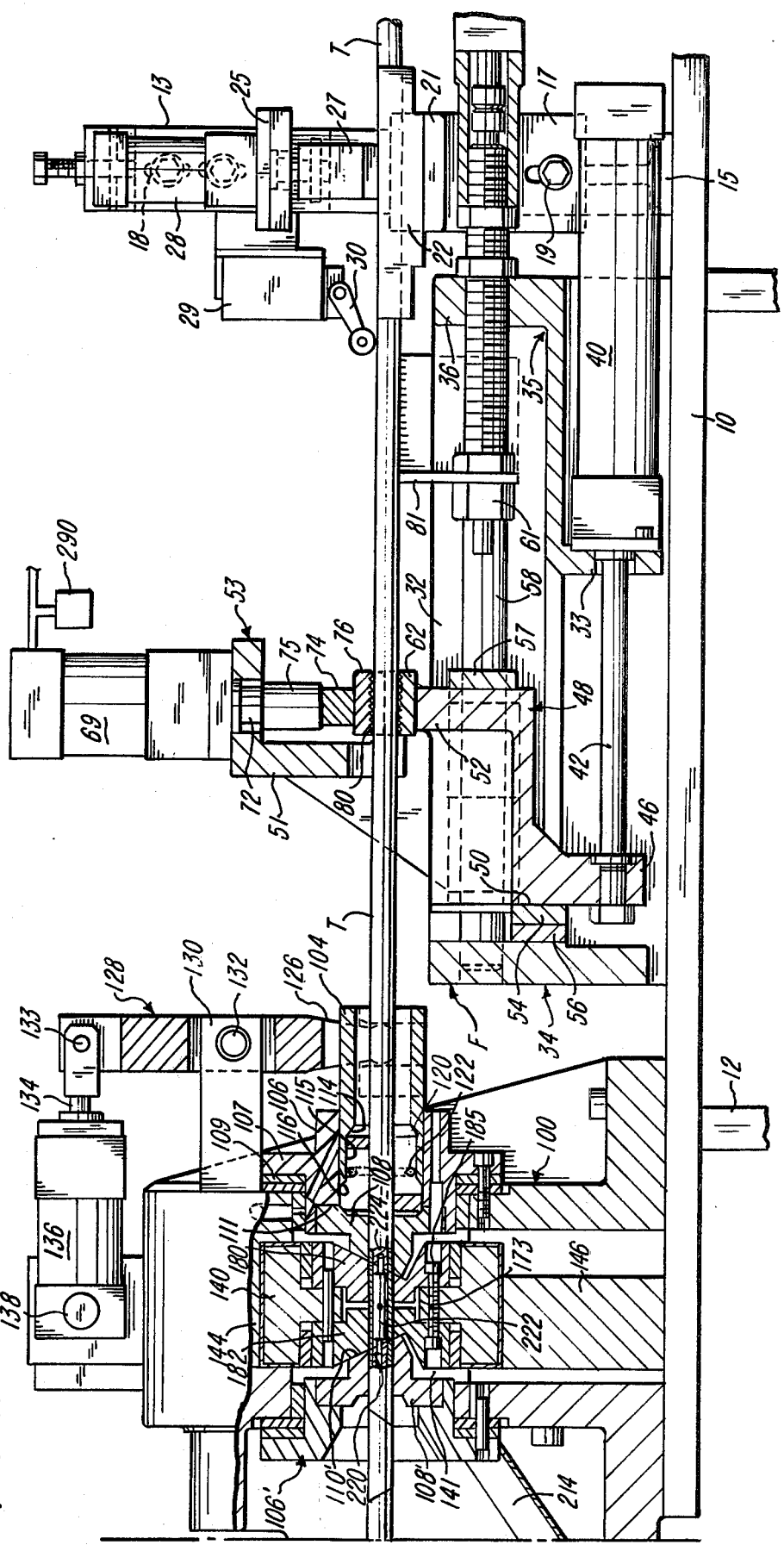

In the drawings the various stations comprised in the invention apparatus, such as the feeding, the shearing and the ejection stations, will be shown from right to left and described in that frame of reference. Moreover, only such features as are necessary to the understanding of the invention will be shown and described in detail. Where detail is not important the elements will be diagrammatically illustrated and only briefly described.

The tube cutting apparatus is mounted on a frame comprised of legs 12 (FIG. 1A) bridged at their top by a generally rectangular longitudinally extending table top 10. Below the table and within the legs 12 are mounted the engine drive means (not shown) needed to power the equipment based on the table.

Figure 2A:
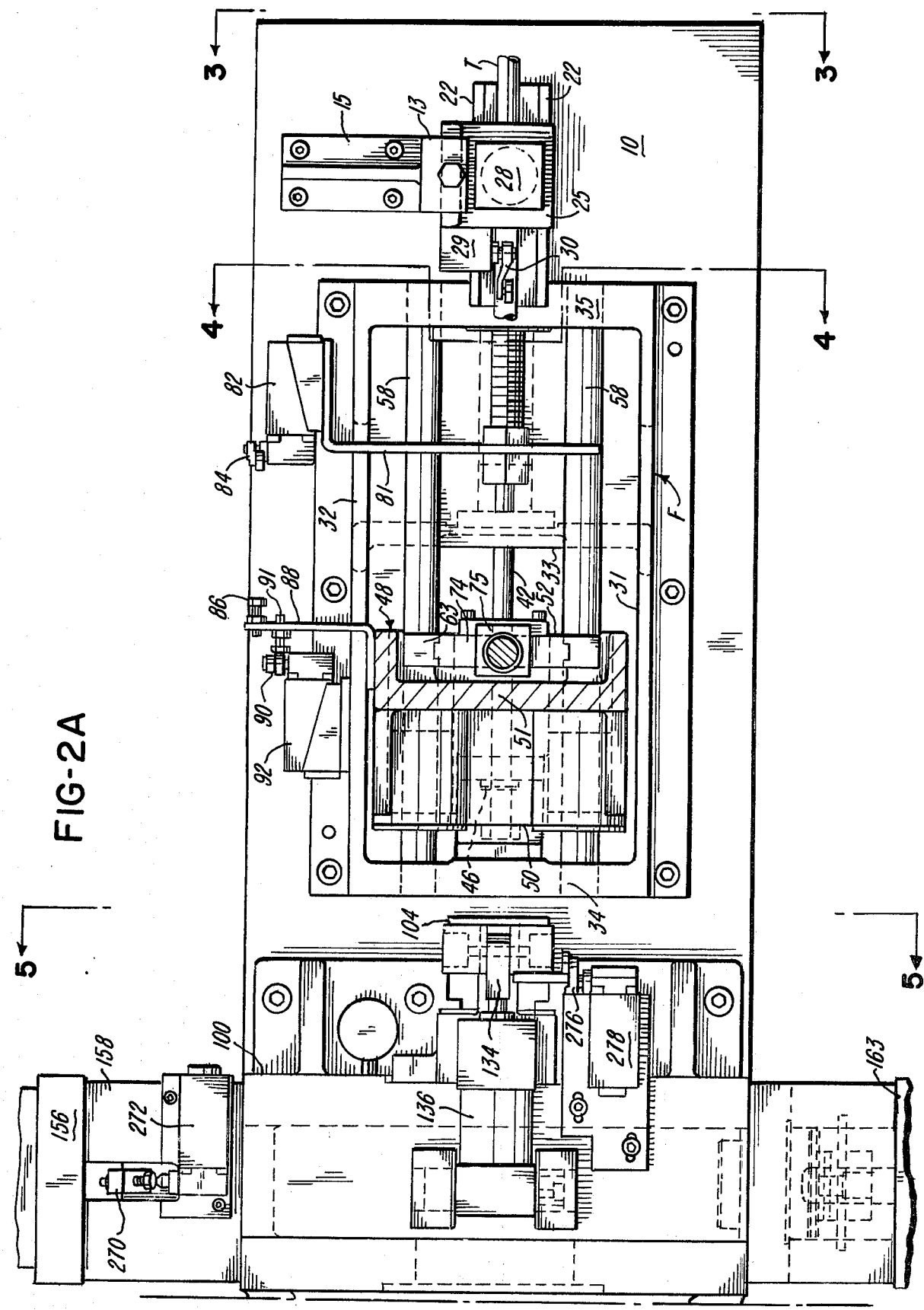

A beam 13 (see also FIG. 2A and FIG. 3) having a right angled base portion 15 firmly bolted to the table top 10, at its right hand end, projects upwardly therefrom and perpendicular thereto. The beam 13 is structurally reinforced by a triangular rib a vertical side edge of which is integral with the surface thereof which faces the rear of the table and the bottom edge of which is integral with the base 15 which is directed towards the rear of the table. Adjustably fixed to that face of the beam 13 which faces what might be considered the front edge of the table 10 are a pair of vertically spaced plates 17 and 24. Each of the plates 17 and 24 include a pair of vertically oriented and aligned narrow slots 18 through each of which is applied the body of a headed bolt 19 the projected end of which is threadedly engaged in and anchored to the beam 13. Washers mount about each bolt to underly its head and bridge the underlying slot. As the bolts 19 are turned inwardly of the beam 13 the heads thereof clamp the underlying washers against the underlying plate, thereby to fix the position of the plates 17 and 24 to the beam 13. Either of the plates 17 and 24 can be vertically adjusted on turning out its securing bolts 19, adjusting its vertical position and then turning in the bolts in a manner believed obvious.

Integral with the upper end of the plate 17 is a perpendicular horizontally oriented plate segment 21 which projects forwardly towards the front edge of the table 10. A saddle block 22 seated on and bolted to the top of the plate segment 21 has a V-groove in its upper surface which extends in a sense longitudinally of the table top 10.

Integral with and projected perpendicular to the plate 24 adjacent its lowermost end is a plate segment 25 arranged in a spaced, parallel, overlying relation to the plate 17 and to mount on the uppermost surface thereof an air cylinder 28. The cylinder 28 is end mounted so that its longitudinal axis is vertically oriented and its piston rod 26 is projected from its lowermost end which is secured in abutted relation to the plate segment 25. The rod 26, which connects at one end to a conventionally pressured piston head (not shown) interiorly of the cylinder 28, projects through a central aperture in the plate segment 25. Fixed to the dependent extremity of the rod 26 is a friction type gripping head 27.

In use of the apparatus described the tubing T to be sheared into small specially formed tube segments is fed from the right hand end of the table 10 and passes first to and through the V-groove formed in the saddle block 22. That portion of the tubing which lies in the saddle may be firmly secured upon suitable operation of the cylinder 28 to project the piston rod 26 and thereby cause its head 27 to frictionally engage and clamp the tubing thereunder to the saddle 22. Since the gripping head 27 is centered over the V-groove the gripping action afforded thereby is well balanced.

The beam 13 also mounts a switch 29 the pivotally mounted and relatively projected operating arm 30 of which is arranged to bear on the tubing T directed through the groove in the saddle 22, at a location spaced immediately to the left of the gripping head 27. In this position thereof the switch 29 is normally open. Should the tubing T being fed pass from the saddle, the arm 30 will drop into the saddle to thereby signal this fact through appropriate circuitry.

A box-like frame F (see also FIG. 4) is fixed to and projects perpendicularly of the upper surface of the table 10 to the left of and in immediately following relation to the beam 13. The frame F has an irregularly shaped generally rectangular configuration. It includes parallel front and back wall portions 31 and 32 which extend in a sense longitudinally of the table top 10, are laterally spaced, and bridged at their respective ends by plate portions 34 and 35. The end plate portion 34 is that which is remote from the beam 13, has a generally flat shape and is vertically oriented. The opposite end plate portion 35, however, has its lowermost portion 33 offset to lie parallel to and more closely adjacent the end plate portion 34 than its upper portion 36.

One end of a horizontally oriented hydraulic cylinder 40 is secured to that side of the plate portion 33 most adjacent the beam 13. The cylinder 40 is conventionally constructed to contain a pressure controlled piston head (not shown) to which is secured and from which projects a piston rod 42. The rod 42 projects through and bears in that end of the cylinder housing which is secured to the plate portion 33 and projects through an aperture therein. Outwardly of and beyond the plate portion 33 the rod 42 projects through and is secured to a leg 46 integral with and dependent from the end of a reciprocable carriage 48 which is most remote from the beam 13. The carriage 48 is mounted on and for movement longitudinally of guide rods 58 which extend between and are secured to the upper portions of end plates 34 and 35 of the frame F. The rods 58 are arranged in a parallel spaced relation and to extend in a sense longitudinally of the table top 10 and through laterally spaced bearings in the respective longitudinally spaced end walls 50 and 52 of the carriage.

Secured to and projected from the outer face of the end wall 50 and the leg 46 which defines a dependent extension thereof is a rectangular bumper strip 54 which is faced by a similar bumper strip 56 on the adjacent surface of plate portion 34. A like bumper 57 is also secured to the outer surface of the carriage end wall 52 which is most adjacent the beam 13. The bumper 57 is centered on the surface to which it mounts and it is so located as to be in facing relation to the head end of a bolt assembly 61 suitably fixed as to its position by mounting thereof to and through longitudinally spaced plate portions of the frame F adjacent the beam 13. The bolt assembly 61 is conventionally adjustable as to its position so as to pre-set the head thereof and predetermine the rearward limit of travel of the carriage 48 as and for purposes soon to become obvious.

The carriage 48 is a box-like frame open at its top and having the vertical extent of its end wall 52 greater than that of its sides or its opposite end wall 50. Integrally connected with the upper end of the wall 52 in line with the V-groove of the saddle block 22 is a generally rectangular C-shaped cup-like frame portion 53 which opens in the direction of the saddle block. As so arranged the back 51 of the cup-like frame 53 is in spaced parallel relation to that side of end wall 52 remote from the beam 13 and projected in the direction of the carriage end wall 50. The upper end of the wall portion 52 at the base of the "C", at its open side, is laterally expanded in a sense from front to rear of the table 10 and has centrally of its upper edge a rectangular notch in which is releasably fit a lower jaw plate 62. Recesses 60 to either side of the notch accommodate upwardly projecting springs 64. Vertically oriented plate segments 63 fixed at the open side of the C-shaped frame portion 53, in respectively spaced parallel relation to each other and to the front and rear edges of the table 10, have vertical grooves formed in their facing sides. These grooves accommodate lug-like projections on an upper plate 74 which aligns vertically with and in co-planar relation to the lower jaw plate 62. The plate 74 is vertically oriented thereby in a plane extending from front to rear of the table top 10 and has suitably secured in a rectangular cutout in its lower edge an upper jaw plate 76. The plate 76 is arranged to directly overlie and be complementary in shape to that of the lower jaw plate 62. Recesses 65 in the plate 74 positioned to either side of the plate 76 are arranged to accommodate the upwardly projecting ends of the springs 64. The springs 64 as so provided normally function to bias the jaw plate 76 to position upwardly from and in a spaced relation to the upper edge of the lower jaw plate 62.

Mounted on the uppermost surface of the C-shaped frame portion 53 is a hydraulic cylinder 69 which projects upwardly therefrom and perpendicular thereto. The cylinder 69 conventionally contains a pressure actuated piston head (not shown) to which is connected a piston rod 72. The rod 72 is projected through a seal in an aperture in the lower end of the housing of the cylinder 69 and through an aligned aperture in the upper side of the frame portion 53. A cylindrical head 75 fixed on and forming an axial extension of the lower projected end of the rod 72 positions directly over and in line with the plate 74. On application of suitable hydraulic pressure to the upper side of the piston head in connection with the rod 72 which disposes interiorly of the cylinder 69, the head 75 presses downwardly to force the plate 74 downwardly to the point where the facing edges of the jaw plates 62 and 76 are brought into a relatively abutting relation, against the separating bias of the springs 64. The facing edges of the jaw plates 62 and 76 are cut so that in a closed position thereof they define an aperture 80 which is positioned in a direct alignment with the V-groove in the top of the saddle block 22. The wall surface which rims the aperture 80 is serrated and axially extended so as to enable the jaw plates to grip the tubing T which is projected therethrough and therebetween as it is fed in the direction of the shearing station of the tube cutting apparatus here illustrated. An opening in the back of the C-shaped frame portion 53 permits the tubing T to pass freely therethrough.

As will be seen, the tubing T will be gripped by the jaw plates 62 and 76 and firmly held thereby in an advancing movement of the carriage 48 as well as during a shearing operation on the advanced tubing. This contributes to a precise function of the shearing elements.

At the point at which the leading end of the tubing T is carried forward by the carriage 48 and precisely positioned thereby for a shearing operation, as will be seen, a switch 92 is closed operating suitable means 27, 104 and 120 (to be further described) to hold the tubing in its advanced position. This results in a closing of a switch 278 to complete a suitably provided circuit causing cylinder 69 to retract its rod 72, whereupon springs 64, by reason of previously stored energy, induce a separation of the jaws 76 and 62 from the tubing. The retraction of the cylinder rod 72 is signalled by a pressure switch 290, which switch triggers the circuitry involved to cause the cylinder 40 to be energized to retract its rod 42 and thereby the carriage 48. As the carriage is fully retracted to the point desired, this condition is signalled by a closing of a switch 82 to complete an appropriate circuit energizing the cylinder 69 to project the rod 72 and thereby close the jaws 76 and 62 once more on the tubing T. The distance of the carriage retraction will be a precise measurement of the length (in this case) of two pieces of the tubing to be simultaneously severed in the shearing station of the described apparatus. As will be obvious, in the retracted position of the carriage its bumper 57 is brought into a flush contact with the facing head of the bolt assembly 61.

A plate 81 forming part of the plate portions of the frame F which support the bolt assembly 61 extends at right angles to the rear edge of the table 10 and has the rearmost end thereof bent at a right angle to the remainder, to mount at its rearmost surface a switch 82 the operating arm 84 of which positions in the path of the head of a bolt 86. The bolt 86 adjustably mounts to project from a plate segment 88. The segment 88 is connected with the frame portion 53 to move therewith and the carriage 48. The segment 88 as so provided is parallel to that portion of the plate 81 which extends at right angles to the rear edge of the table 10 and mounts another adjustably mounted bolt 91 the head of which is projected from that face thereof which is remote from the switch 82. The head of the bolt 91 is in line with and operable on the operating arm 90 of a switch 92 fixed in its path, in connection with frame structure F at a location towards the end thereof which is most remote from the beam 13.

In engaging the arm 84, the bolt 86 not only signals completion of the rearward movement of the carriage 48 in the direction of the beam 13, the extent of which movement is set in accordance with the length of the tubing segments to be sheared, but, as previously mentioned, directs this signal through appropriate control circuitry to cause the operation of the cylinder 69 to move the head 75 in a direction to close the jaw plate 76 on the jaw plate 62. At this point the tubing T is firmly gripped between the jaw plates.

When a shearing operation is completed and the shearing apparatus is ready for a subsequent shearing operation, the ejector apparatus of the described embodiment of the invention is cycled and on the completion of this ejector cycle a switch 190 is closed to complete a circuit activating the cylinder 40 to project its rod 42 and thereby advance the carriage 48 and tubing T in the direction of the shearing station herein described. In the process of this advancement switch 92 is closed by bolt 91 engaging the arm 90, as a result of which a sleeve 104 is caused to move towards the shearing station to clamp a collet assembly 120 about and in a fixed relation to the tubing T.

As seen in FIG. 1A, immediately beyond and to the left of the carriage 48, the tubing to be sheared passes to and through a vertical framework 100 (see also FIG. 5) which presents to the tubing a feeding passage. The tubing first passes, however, through the sleeve 104 which constitutes a collet operator. The end of the sleeve 104 remote from the carriage 48 bears for reciprocation in, longitudinally of and on the inner surface of a tubular cylindrically configured adapter 106. The adapter 106 which is partially nested in a complementary opening in one side wall portion of the framework 100 includes an annular radially projected external flange 107 intermediate its respective ends. As the adapter 106 is applied to the opening in the framework 100, its flange 107 overlaps the outer wall surface of the framework and is fixed thereto by bolts. Interposed between the flange 107 and the framework 100 are a plurality of spacer rings 109 the number and nature of which is in accordance with the position required for the end of the adapter 106 which faces inwardly of the framework 100. The inwardly facing end of the adapter 106 is counterbored to form therein a recessed annular shoulder 111 which provides a seat for the expanded cylindrically shaped base of a die button 108. The die button 108 has a central aperture, accommodating the passage therethrough of the tubing T, the longitudinal axis of which is maintained horizontal and parallel to the plane of the table top 10. The cutting face 110 of the die button 108 faces inwardly of the framework 100 and is so configured as to be sloped to incline to the longitudinal axis of the die button and the applied tubing. The lowermost edge portion of the cutting face 110 is cut away for clearance purposes, as will be seen in FIG. 1 of the drawings.

The inner surface of the sleeve 104 is generally cylindrical and uniform in cross section the major portion of its length. However, in the portion thereof which lies within the limits of the adapter 106 (reading from right to left in FIG. 1) the inner surface of the sleeve 104 is successively expanded in two steps. The stepping of the inner surface of the sleeve 104 provides it with a first relatively short conically expanding surface portion 114 followed by a surface portion 115 of relatively short length which is uniformly cylindrical in cross section the projected end of which is followed by a further very short conically configured wall surface portion 116 further expanding the cross section of the interior of the sleeve 104 at its terminal end. Seated in the end of the passage through the sleeve 104 which is expanded, immediately behind the die button 108, is the collet assembly 120 which is segmented in a circumferential sense. The segments of the collet 120 in their composite have a groove circumferentially of their outer periphery accommodating a garter type spring 122 which holds the segments in a relatively assembled relation. In a sense longitudinally thereof the outer periphery of the collet 120 is stepped to be successively reduced in outer diameter twice, from the end adjacent the die button 108, the steps being in the form of conically shaped surface portions which are complementary to the steps formed in the inner surface of the sleeve 104 by the conical surface portions 116 and 114.

As will be clearly seen from FIG. 1A of the drawings, a movement of the sleeve 104 to the left causes a contraction of the collet in a radial sense by reason of which the collet segments are brought together and clamped about and to the tubing T which is passed therethrough. Opposite movement of the sleeve 104 relieves the collet segments from their clamped relationship, to permit movement therethrough of the tubing T without interference.

At the outer surface thereof the sleeve 104 is provided with diametrically opposed grooves located respectively at its front and rear sides, into which grooves respectively project the dependent fingers 126 provided by a bifurcation of the lower end of a vertically oriented control plate 128. Intermediate its vertical length the plate 128 has a central aperture accommodating a fingerlike element 130 which connects to and projects from the framework 100. Projecting through the finger 130 and the plate 128 in a sense from front to rear of the table 10 is a pivot pin 132. The pin 132 provides for a pivotal mount of the plate 128 on the finger 130. The upper end of the plate 128 has a notch bridged by a pivot pin 133 which extends through the projected end of a piston rod 134. The rod 134 has the opposite end thereof projected interiorly of one end of a hydraulic cylinder 136 to connect therein to a pressure controlled piston head. The opposite end of the cylinder 136 is pivotally connected at 138 to and between parallel plate-like projections at the top of the framework 100. With the structure so provided the cylinder 136 is controlled in a timed relation to movements of the carriage 48 to project piston rod 134 to shift sleeve 104 to clamp the segments of the collet 120 to the tubing T and to retract rod 134 to release the collet segments and permit relative movement of the tubing T.

The wall of the framework 100 remote from that incorporating the adapter 106 has an aperture facing that accommodating the adapter and similarly accommodating an adapter 106' which is generally configured the same as the adapter 106 but reversely faced. The adapter 106' is thus aligned with the adapter 106 and includes a central aperture counterbored at the end thereof most adjacent the adapter 106 to seat therein a die button 108'. The die button 108' is similar to the die button 108 and bolted to the adapter 106' which is bolted in turn to the framework 100 by means and in a manner similar to that described with reference to the adapter 106. The die button 108' presents inwardly of the framework 100 a cutting surface 110' longitudinally spaced from but directly opposed to the cutting surface or face 110 on the die button 108. The arrangement provides that the cutting surfaces 110 and 110' incline towards each other from top to bottom, having regard to the underlying plane of the table top 10. The surfaces 110 and 110' as so disposed are arranged at respectively opposite sides of a cavity 141 defined interiorly of the framework 100. Arranged to reciprocate in the cavity 141, in a sense from front to rear of the table 10, is a rectangular slide 140. The slide 140 is mounted for movement within and longitudinally of the inner limits of a frame 142 supported in connection with portions of the framework 100 and at right angles to the common central longitudinal axes of the facing fixed die buttons 108 and 108' and the tubing T which threads through the central apertures provided in the facing die buttons.

The frame 142 comprises upper and lower guide portions respectively designated by the numbers 144 and 146 connected at their adjacent ends by end plates 148 and 150.

To effect fore and aft reciprocation of the slide 140 in the frame 142 the framework 100 has in connection therewith structure mounting two hydraulic cylinders 152 and 154.

Figure 7:
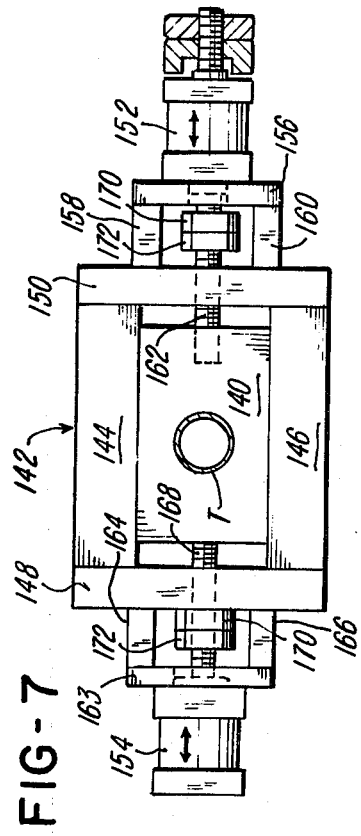
FIG. 7 is a generally diagrammatic view illustrating the operation of the movable die portion of the shearing apparatus illustrated.

The cylinder 152 is end mounted to project horizontally and perpendicular to a vertically oriented plate 156 positioned in parallel, centered, and rearwardly spaced relation to the end plate 150 of the frame 142 which positions most adjacent the rear edge of the table top 10. The spacing between the plates 156 and 150 is maintained by interposed, horizontally oriented, vertically spaced bar elements 158 and 160. The piston rod 162 in connection with a pressure controlled piston head (not shown) interiorly of the cylinder 152 extends through the seal in the end of the cylinder abutted and fixed to the plate 156 and through an aperture therein and a further and relatively aligned aperture in the end plate 150 to have its projected extremity threadedly engaged in the rearmost end of the slide 140 (FIG. 7).

The cylinder 154 is similarly mounted to a plate 163 which is parallel to the end plate 148 of the frame 142 and spaced therefrom by interconnecting relatively vertically spaced horizontally oriented bar elements 164 and 166. The cylinder 154 is axially aligned with the cylinder 152 and the piston rod 168 thereof which is connected to the piston head (not shown) interiorly of the cylinder projects outwardly through a seal in the end of the cylinder housing secured to the plate 163 and then through axially aligned apertures in the spaced plates 163 and 148 to engage in abutting relation to the end of slide 140 most adjacent the front edge of the table top 10 and at a point in a direct alignment with the rod 162.

A nut 170 and a lock nut 172 are mounted in a paired relation on each of the piston rods 162 and 168, which are externally threaded, intermediate plates 148 and 163 in the one case and the plates 150 and 156 in the other. By adjustment of these nuts one can limit the extent of travel of the slide 140 in each of the opposite directions in which it may be moved.

The slide 140 is a rectangular plate structure having a central aperture 173 counterbored to each of its opposite ends. Each counterbore nests a cutting die, the cutting dies being respectively numbered 180 and 182. Each of these cutting dies has a peripheral flange-like portion which seats to the annular shoulder defined by the counterbore in which it nests. In each case the flange is connected to the shoulder to which it seats by bolts 185.

The cutting die 180 has a paired relation to the die button 108 while the die 182 is paired with the die button 108'. Prior to a shearing operation the slide 140 is positioned to have its central aperture in co-axial alignment with the apertures centrally of the die buttons 108 and 108' and the adapters 106 and 106' in which they mount. The outermost face of each of the cutting dies 180 and 182 is concavely configured in a vertical sense and adapted to nest the facing portion of the adjacent die button 108 or 108'. The shaping of the outermost face of the cutting die 180 produces therein a recessed, sloped cutting face 187 complementary in shape to that of the cutting surface 110. By reason of the position and sloping of the cutting faces 110 and 187 and the surfaces of which they form a part, slide 140 may be reciprocated to move the face 187 relative the cutting face 110 in a close fitting relation thereto.

The outermost surface of the cutting die 182 has a cutting face 187' shaped similarly to the face 187 and arranged to be complementary in shape and similarly related to the cutting face 110'.

As the cutting dies 180 and 182 are positioned in facing co-axial relation to the adapters 106 and 106' and their mounted die buttons, the central apertures in these elements commonly receive therethrough the lead end of the tubing T.

Since the cutting dies 180 and 182 are connected in a back to back relation in a shearing operation, they may be considered as a unit which moves with and under the influence of the reciprocation of the slide 140 to and from a facing relation to the die buttons 108 and 108', the latter of which may be considered as relatively fixed cutting dies.

In the embodiment of the invention here illustrated the dies 180, 180, 182 and 108' define two cutting planes which, as seen in FIG. 1, relatively converge as they extend in a sense from top to bottom of the cavity 141 in the frame 100. On the positioning thereof in the shearing station provided by the dies above described, the lead end of the tubing T will have slip fit therein a punch 222 one of the extremities of which is formed and positioned to lie in the plane occupied by the cutting surface 187 and the other of which will be formed and positioned to lie in the plane of the cutting surface 187'. A second punch 220 is slip fit in the outermost end of the tubing T to position in end abutting relation to and to form an axial extension of the punch 222. The abutting end of the punch 220 has a cutting face the shape of which is complementary to that of the adjacent end of the punch 222 and lies in the plane commonly occupied by the cutting face 110' of the die button 108'. A third punch 224 positions inwardly of the punch 222 in end abutting relation. The abutting ends of the punches 222 and 224 have complementary slopes and that of the punch 224 is positioned to lie in a plane commonly occupied by the cutting surface 110 of the die button 108. Immediately inward of the punch 224 is a snubbing device 226. The latter is constructed to be frictionally retained in the position in which it is set within the tubing T to insure the successively applied punches 224, 222 and 220 will be properly positioned for a shearing operation produced by a reciprocation of the slide 140 and together therewith the cutting dies 180 and 182. The composition and application of the respective punches and the snubbing device will be further described.

The framework 100 has in fixed connection therewith a horizontally oriented arm-like extension 101 (FIGS. 1B and 2B), the upper level of which is spaced below that level at which the tubing T is threaded through the elements which define the shearing station in the framework 100. The end of the arm 101 most remote from the framework 100 mounts, on suitable supports, a hydraulic cylinder units 202. Contained for reciprocation in the cylinder 202 is a conventionally operated pressure controlled piston head (not shown). A rod 204 one end of which is connected to the piston head projects outwardly of that end of the housing of the cylinder 202 which is most adjacent the framework 100 and through a seal therein to connect to and be axially extended by a co-axial rod 206 serving as an ejector device. The rod 206 is rectangular in cross-sectional configuration and bears for reciprocation in and longitudinally of a complementary shaped bore in a guide block 208. The end of the guide block 208 most remote from the cylinder unit 202 presents a sloping surface 210 which is disposed to lie in spaced parallel relation to the cutting surface 110 on the die button 108. The guide block 208 is spaced outwardly from the framework 100 and its surface 210 is positioned to overlie one edge of an opening 212 in the arm structure 101, below which opening there is normally provided a receptable the purpose of which is to receive those tube segments which are cut from the leading end of the tubing T. A chute-like tray 214 fixed to incline downwardly and to project over one edge of the opening 212 in the arm 101 has the upper end thereof connected immediately below the leading extremity of the tubing T which immediately preceding a shearing stroke projects into a cavity in the rear face of the adapter 106'.

The details of the structure here provided for reciprocating the ejector rod 206 may be provided in various forms by mechanics versed in the art. Therefore they are neither fully shown nor fully described and merely referred to in general terms to the extent necessary for a complete understanding of the present invention.

In particular, the outwardly projected end of the rod 206 has a recess 216 (FIG. 6) forming a socket in which is seated a spring 227 biased against the expanded head end of a pin-like plunger 225. Inserted in the open end of the socket is a sleeve-like bearing 221 threadedly connected to the inner peripheral wall surface of the socket to provide a limiting shoulder 223 against which the spring might seat the plunger head. The outermost end of the bearing 221 is spaced from the mouth of the socket, providing thereby that the body of the plunger 225 will normally project through the bearing as it extends to the open mouth of the socket. The end of the ejector rod defining the mouth of the socket has a diametral groove 229. The end of the punch 220 adjacent the socket end of the ejector rod 206 has a tang-like projection 228 having a flat rectangular configuration to be received in and contained by the wall surfaces of the groove 229. A releasable coupling is thus defined between the ejector rod and the punch 220 which establishes the relative orientation of this punch and, as will be seen, all the associated punches. Further, through the medium of the plunger 225 the spring 227 functions to insure that the punch 220 stays in its established position on the retraction of the plunger 206 in an ejecting cycle.

Figure 6:
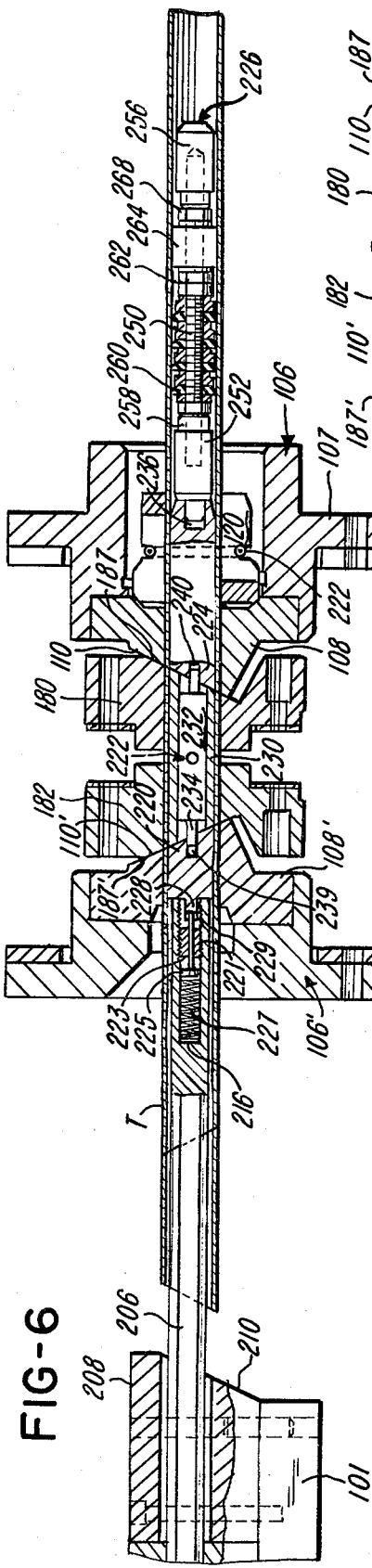
FIG. 6 is a longitudinal sectional view, partly diagrammatic in character, illustrating the cutting and ejection apparatus embodied in the illustrated structure.

The punch 222, which is movable relative the punches 220 and 224 in a lateral sense, consists of a cylindrically configured outer sleeve 230 containing a relatively pinned shorter rod-like element 232 the respective ends of which terminate short of the respective ends of the sleeve. As seen in FIG. 6, the ends of the punch 222 are sloped with reference to its longitudinal axis to give it a trapezoidal outline, in vertical elevation, when the punch is properly positioned and ready for use. Integral and co-axial with and projected from each of the opposite ends of the rod 232 is a tang 234 which is rectangular in cross-section and projects outwardly of and beyond the adjacent end of the sleeve 230. As the punch 222 is positioned in the tubing T ready for a shearing operation, one tang 234 is received in the diametrally arranged groove 239 in the adjacent facing end of the punch 220, which groove has parallel guide walls which immediately confine the tang to permit only a relative straight line horizontal movement therebetween. The oppositely projected tang 234 is received in and similarly related to a similar diametrally extending groove 240 in the adjacent end of the punch 224. The arrangement is such as to prevent a twisting or turning of one punch relative the other and to insure that, as a shearing operation occurs, the reciprocating movement of the cutting dies 180 and 182 in a sense transverse to the tubing T will be accommodated by a similar horizontal movement of the punch 222. The end of the punch 224 remote from the punch 222 is squared off and embodies therein a rectangular socket 236 in which is nested a rectangular projection at the adjacent end of the snubbing device 226.

The snubbing device comprises a short cylindrical, externally threaded rod member 250, the outermost end of which is expanded by a threadedly engaged relatively enlarged cylindrical head portion 252 embodying the male projection which nests in the socket in the adjacent end of the punch 224. Threadedly engaged on and forming an axial extension of the innermost end of the rod 250 is an axially extended cylindrically configured pilot head 256. Mounted on the rod element 250 between the head portions 252 and 256, (FIG. 6) reading from left to right, is an assembly 258 comprised of a washer, nut and an associated jam nut abutted to the head 252 followed by a series of spaced resilient, compressible ring-like gripper elements 260 made of a urethane or like material. The latter is backed by an assembly 262 comprised of a further washer, a nut and a jam nut immediately followed by a resilient compressible sleeve 264, which is preferably made of a felt or like material. The sleeve 264 is then followed by an assembly 268 comprised of a washer, a nut and a jam nut end abutted to the pilot head 256. It is to be understood that the snubber device is so assembled and the compressible elements thereof so dimensioned that as the snubber device is inserted in the leading end of the tubing T the elements 260 as well as the resilient felt sleeve 264 will be expanded against and compressed by the inner wall of the tubing.

In commencing a shearing operation, it is to be understood that the tubing from which segments are to be cut is provided in coil or rod form. In any case the lead end of the tubing is introduced into the described tube cutting apparatus by threading the same through the V groove of the saddle block 22 which is then clear, the aperture 80 defined by the jaws 62 and 76 which are then separated, the sleeve 104, the collet 120 which is then relaxed, the die buttons 108 and 108' and the cutting dies 180 and 182 therebetween to the point where the leading end of the tubing is located in the concavity to the rear of the adapter 106'. Before commencing the operation of the described apparatus, the snubbing device 226 is first inserted in and pushed inwardly of the leading end of the tubing following which the punch 224 is applied until the socket 236 at its innermost end telescopes over the projection at the outer end of the head element 252. The arrangement is such that the outermost end of the punch 224 presents to the movable punch 222, which is then inserted in the leading end of the tubing T, a horizontally oriented slot 240 which receives and accommodates the tang 234 projecting from the innermost end face of the punch 222.

The punch 220 is then slip fit in the leading end of the tubing and positioned, in a rotative sense, to accommodate the tang 234 on the outermost end of the punch 222 in its diametral groove 239 in its abutting end face. The proper positioning of the punches is then insured by the projection of rod 206 into the leading end of the tubing T under the influence of pressure applied to the piston head in the cylinder 202. Rod 206 is appropriately set, by suitable means, to limit its advance so the punches will be precisely set and located concentric to the respective cutting dies and so their abutted cutting faces lie in the two planes respectively defined by the cutting faces of the die buttons 108 and 108' and their facing cutting dies. The arrangement brings the cutting face of punch 220 in a position to be co-planar with the cutting face 110' of the die button 108', the cutting face of the punch 224 co-planar with the cutting face 110, and the respective cutting faces of the punch 222 respectively co-planar with cutting faces 187 and 187'. At the same time that the projected extremity of rod 206 comes into position to abut the outer end of the punch 220, the tang 228 on the adjacent end of the punch 220 will enter its diametral groove 229 and in the process thrust the plunger 225 inwardly of the ejector rod, thereby compressing the contained spring 227.

It will be seen that the preset and controlled movement of the rod 206 will not only properly position and set the punches but it will also set the required position of the snubbing device and, in fact, establish the rotational position of all these elements which are related in end to end relatively abutting relation. By reason of its frictional relation to the tubing T as contrasted to the slip fit of the punches, the snubbing device will maintain its back-up position as the ejector rod reciprocates in an automatic operation of the apparatus described.

With the punches and snubber device as well as the slide 140 properly positioned, by means of suitable manual controls of a conventional nature, the slide 140 may be operated through the medium of the cylinders 152 and 154 to cause two segments to be severed from the leading end of the tubing T. As the segments are sheared and the slide 140 is then centered so as to be ready for the next shearing operation, a switch 273 (FIG. 5) is triggered to close a circuit to energize the cylinder 202 to retract the ejector rod 206. At the same time a circuit is closed energizing the cylinder 136 to retract its rod 134 whereby to retract the sleeve 104. This releases the collet 120 from its clamped relation to the tubing T.

On retraction thereof, the rod 206 closes a switch 218 (FIG. 2B) completing a circuit causing cylinder 202 to immediately project the rod 206 to its cutting position, whereupon a switch 190 is hit to close a circuit energizing the cylinder 40 to project its rod 42 and advance the carriage 48 from its retracted position toward the shearing station. Since the jaws 76 and 62 are at this time clamped to the tubing T, as the carriage moves the tubing is advanced thereby the precise length of the next two segments to be separated from the tubing. At the end of its forward travel the carriage trips switch 92 closing the circuit which energizes the cylinder 136 to project its rod 134 and cause sleeve 104 to clamp the collet 120 to the tubing. Simultaneous with this action an appropriate circuit is closed causing the cylinder 28 to project the head 27 to fix the position of the tubing thereunder to the saddle 22. At the same time switch 278 is closed by the movement of plate 128 completing a circuit to cause cylinder 69 to retract the head 75, providing thereby for an opening of the jaws 76, 62 under the influence of the springs 64. On retraction of the head 75 the pressure switch 290 in the hydraulic line connected to the cylinder 69 sends a signal thereof producing a completion of a circuit causing cylinder 40 to retract rod 42 and the carriage 48. On completion of this stroke the head of bolt 86 will close the switch 82 and the cylinder 69 is once more energized thereby to project the head 75 and produce a clamping of the jaws 76 and 62 about the tubing T, ready to carry the tubing forward to the shearing station that distance which is precisely required to present thereto the tubing section comprising the tube segments to be next cut by the dies in the shearing station, as and when an appropriate signal to commence this operation is delivered to the cylinder 40. The advance of the tubing by the forward movement of the carriage 48 pushes previously cut segments onto the ejector rod 206. Moreover, substantially simultaneous with a release of the tubing by the jaws 76, 62, the shearing cycle of the cylinders 152 and 154 is initiated and completed, following which the rod 206 is retracted. As the rod 206 is retracted into the block 208, the previously cut segements are stripped as the leading thereof comes into contact with the face 210 of the guide block. The strip segments fall through the opening 212 to the underlying receptacle. As the first cut segments drop into the receptacle, it will be found that the leading thereof will have one end corresponding to the shape of the original leading end of the tubing and the other cut at an angle oblique to the longitudinal axis of the segment. The second segment will have both ends symmetrically inclined to its longitudinal axis. It will be noted that the retraction of the rod 206, by reason of a connected plate-type operator, closes the switch 218 resulting in an immediate reversal of the direction of its movement and a projection of its leading end back into the leading end of the tubing T. The ejector rod is thus placed in what may be termed its "ready" position in which it will receive previously cut tube segments from the shearing station as they are pushed therefrom under the influence of the advancing tubing which may be carried forward to the shearing station by the carriage 48.

The operation of the apparatus may be interrupted to enable a checking of the second segment of the tubing originally sheared which is then disposed in the receptacle under the opening 212. One may then quickly determine whether or not the settings of the invention apparatus are as required to produce the segments in the form desired. If adjustments are necessary, they may be made immediately, before continuing with an automatic operation of the described machinery.

In an automatic function of the described apparatus, with the leading end of the tubing to be reduced to segments set in the shearing station, and as required for a shearing operation, consider that the shearing operation has been effected and the cylinders 152 and 154 have been operated to complete their cycle the end result of which is a placement of the sheared segment of tubing within the confines of the die elements 180 and 182 concentric therewith and in direct coaxial alignment with the tubing to the front and rear thereof. At this time the piston rod 134 of the cylinder 136 will be in a retracted position and the sleeve 104 will be in a position in which it has released the segments of the collet 120 from their clamped relation to the tubing T. Also, at this time, the carriage 48 will be in a retracted position, the rod 42 being withdrawn inwardly of the cylinder 40. The jaws 76, 62 will be in a clamped relation to the tubing T ready to advance the tubing the precise length of the tube segments to be simultaneously cut in the shearing station upon receipt of an appropriate signal. Since the collet 120 is not clamped at this time, the friction head 27 will be retracted from the tubing T thereunder.

Considering the noted parts in the positions described, as the immediately preceding shearing cycle was completed switch 273 was closed energizing the cylinder 202 to produce a retraction of the ejector rod 206. As the ejector rod retracts, any previously sheared tube segments which may be mounted thereon will be stripped therefrom by engagement of the leading thereof with the surface 210 of the guide block 208.

Fixed to project laterally and in a sense radial to the central longitudinal axis of the ejector rod is a plate-like element which as the ejector rod is fully retracted comes into contact with the operator arm of a switch 218 to thereby close the switch. This produces a completion of a circuit which immediately energizes the cylinder 202 to produce a projection of the rod 206 in a conventional manner placing the projected extremity thereof back in the leading end of the tube segments in the shearing station which are backed by the coaxial leading end of the tubing to be further sheared and reduced to addtional segments. As the ejector rod moves back to its cutting position within the leading end of the tubing in the shearing station, the same operator plate which previously closes the switch 218 during the retraction thereof will at this point come into contact with the control arm in the path of its movement which is operated thereby to close a related switch 190. This completes an appropriately provided circuit which energizes the cylinder 40 to project the rod 42. The result is an advancement of the carriage 48, and the tubing to which it is firmly clamped through the medium of the jaws 76 and 62. As the tubing is advanced the precise amount required in respect to the shearing station defined by the cutting dies and punches here provided, the head of the bolt 91 in connection with the carriage will engage the operating arm 90 of the switch 92, closing the switch and an appropriate circuit energizing the cylinder 136 to project its rod 134 and provide that the sleeve 104 clamps the collet 120 to and about the tubing T, establishing the leading end of the tubing to be cut in the precisely required position which is needed for the next shearing operation.

As the cylinder 136 operates to produce a clamping of the collet 120, at the same time the cylinder 28 is operated to project its head 27 to fix to the saddle 22 that portion of the tubing T which is now over the saddle. As the rod 134 is operated to cause a clamping of the collet 120 an operator arm in connection with the plate 128 moved thereby operates the control arm 276 of the switch 278 to close the switch. This produces the completion of separate circuits one of which produces an energization of the cylinder 69 to retract the rod 72 and the head 75 to release the jaw plate 76 to free the tube T from its clamped relation to the carriage 48, this being reflected in the pressure switch 290 and correspondingly in an operation of the cylinder 40 to retract the rod 42 and thereby the carriage 48, in the process of which the bumper 57 comes into contact with the limiting head of the bolt assembly 61. At the same time the bolt 86 in connection with the arm 88 fixed to the carriage 48 will have the head thereof abut the control arm 84 to close the switch 82 and thereby a circuit energizing the cylinder 69 to bring the jaw plate 76 down about the tubing, by reason of which the jaws 76 and 62 are once more fixed in a clamped relation to the tubing, in a ready position for carrying the tubing forward once more upon appropriate signal to the cylinder 40.

Figure 8:
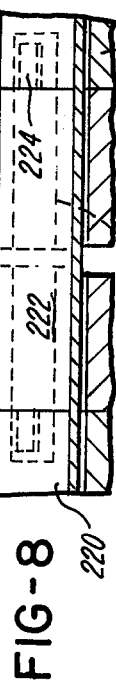
FIGS. 8, 9 and 10 are fragmentary generally diagrammatic illustrations of the sequence in which tube segments are severed and then realigned with the tubing from which they have been severed.
Figure 9:
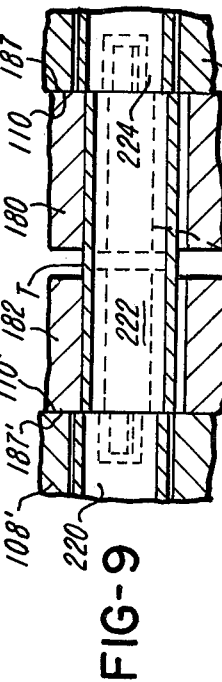
Figure 10:
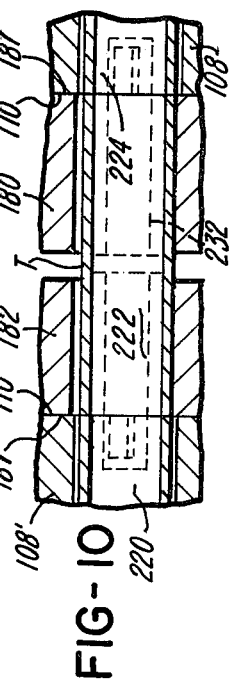

As the carriage 48 is freed from the tubing T and induced to retract, substantially simultaneously therewith the other circuit which is closed with the closing of the switch 278 energizes the cylinder 152. This produces a retraction of the piston rod 162, thereby to move the slide 140 in a sense rearwardly of the table top 10. In the process the cutting faces 187 and 187' of the respective back-to-back dies 180 and 182 will move sufficiently relative to the cutting faces 110 and 110' to shear the wall structure of the tubing T in their path in two longitudinally spaced planes and in a simple relatively short single stroke thereof. This single stroke produces a separation from the leading end of the tubing of two identical tube segments which in vertical elevation as cut will each have a generally symmetrical trapezoidal outline, though in cut position one is inverted as to its configuration relative the other. It should be recognized from the diagrammatic showing of FIGS. 8 through 10 of the drawings that in the first instance there is a limited clearance between the dies 180 and 182 and the concentrically positioned tubing which they surround in the shearing station. Thus, as rod 162 is retracted there is an initial lost motion prior to contact of the dies 180 and 182 with the tubing segment which they surround. When a flange on the nut 172 on rod 162 hits an arm 270 in its path (FIG. 5), this will produce a closure of a related switch 272. The switch 272 completes a circuit causing the cylinder 152 to reverse itself and to project the rod 162. The projection set is made sufficient that the dies 180 and 182 will be caused to first move relative to and then bear against the segment which they have severed until it is realigned to be coaxial with the leading end of the tubing also simultaneously severed and the length of the tubing from which both segments have been severed. Accordingly, there is an overtravel of the dies 180 and 182, which overtravel is accommodated by a corresponding movement of rod 168 of the cylinder 154. On the completion of the overtravel, an arm in connection with the moving rod 162 hits and closes a switch 300 completing a circuit to energize the cylinder 154 to then project rod 168 against the slide 140 and against the bias of the rod 162 on the opposite side thereof. The net result of this action is to realign dies 180 and 182 with dies 108 and 108' and to position them once more in concentric spaced relation with the tubing and its severed segments.

As the piston rod 168 completes the severing function, to signal completion of the shearing operation the radial flange on the jam nut 172 in connection therewith comes into contact with an operator arm 271 in its path producing a movement of such arm to close the switch 273 energizing the cylinder 202 to retract the rod 206. As previously mentioned, in the retraction of the rod 206 it will carry therewith any tube segments which have been previously severed and moved thereon to strip the same as these segments are brought into contact with the face 210 of the guide block 208. The retracting rod will have the operator arm in connection therewith hit the switch 218 whereby to reverse the direction of the operation cylinder 202 and project it forward to its cutting position as previously described. Upon reaching its cutting position the operator arm in connection with the rod 206 will close the switch 190 energizing the cylinder 40 to advance the tubing and restart the operating cycle of the described apparatus.

Particular attention is directed to the interrelation of the punches 220, 222 and 224 with each other and with the snubber device 226 as well as the ejector rod 206. The snubber device 226 as frictionally coupled to the inner wall of the tubing T serves as an inner base for the keyed punches while the ejector rod serves as an anchor at the opposite end thereof to provide a male-female interconnection therebetween. This keeps the punches in their proper interrelation to the cutting dies in the shearing station, prevents their relative rotation and maintains the required horizontal attitude thereof and in effect provides a support for the leading end of the tubing T which precisely positions such leading end in the shearing station defined by the dies 108, 180, 182 and 108′, under the influence of the rod 206.

Further attention is directed to the fact that the pressure switch 290 is employed to reflect the pressure condition in the cylinder 69 and thereby serve in the cycle of operation of the apparatus to provide signals leading to the completion and interruption of the circuits involving the respective functions of the feeder carriage and the related clamps through the medium of which tubing may be advanced to the shearing station a precisely required amount and upon release of which the carriage may be freely retracted a precisely required amount in accordance with the length of the tube segments to be cut in the shearing station.

With reference to the construction, arrangement and function of the cutting dies, they afford a simple but effective medium to shear extremely short as well as conventional tube segments so as to provide them with ends which are other than squared off and to optionally provide them with ends which are oblique to their longitudinal axis. Of course, as should be obvious, the invention apparatus may be applied to effecting high volume production of conventional tube segments. A further significant feature of the invention shearing apparatus is that multiple tube segments may be cut with a single stroke. The arrangement is of such a nature that there is no scrap produced between pieces and the form of the pieces as sheared evidences an optimal condition thereof. Obviously, the ends of the tube segments may be variously configured as suits the application. Further, the punches which function as cutting dies also embody by their interrelation one movable punch 222 which displaces to accommodate the movement of the dies 180 and 182 and returns to its aligned keyed relation to the adjacent punches 220 and 224 upon completion of a shearing operation. The mutuality of the function and cooperation of the elements as here provided is of the simplest nature, yet it does insure alignment and precision not only of the tubing and segments which may be severed therefrom in the shearing station but of the dies and punches. The net result is a high quality product.

Even more important, from a commercial standpoint, is that use of the invention in tube cutting apparatus will give a 100% or more increase in production for a given period of time and an ability to produce tube segments not only of extremely short length but with their ends cut at various angles to their longitudinal axis, in selected fashion. Here there is also a basic material savings. Quite important at this point in time is the unobvious result of savings in energy for a given production. All in all, the sum of the benefits described produces a significant advance in art in which developments have been rather limited for a great number of years.

In summary, the cycle of operation of the invention system and the relation of its parts is extremely simple and lends itself to ease of fabrication. By the same token it simplifies maintenance procedures.

The exemplary illustration of an embodiment of the invention herein described has avoided a detailing of the hydraulic power unit and related valves which are necessary for cycling the invention apparatus. It has also avoided a detailing of the circuitry related to the primary switches involved in an automatic cycling of the invention apparatus. This has been deliberate in order to avoid clouding the substance of the invention and particularly in view of the fact that the circuitry involved may be achieved in various fashion by those versed in the art, once the disclosure of the present invention is available. Thus, the controls have been disclosed diagrammatically and only to the extent necessary for an understanding of the present invention. The primary switches have been indicated and a sequence operation thereof described in a diagrammatic frame of reference but that is believed sufficient to lead anyone versed in the art to have a thorough understanding of the substance of the parts of the invention and their function.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect and the invention is therefore claimed in any of its forms or modifications within the legitimate and valid scope of the appended claims.

The embodiments of the invention in which an exclusive property or privilege is claimed are defined as follows:

1. Apparatus for cutting tubing into pieces of a desired length, including a shearing mechanism, means for feeding a leading end of tubing to said shearing mechanism in incremental steps each corresponding in length to a multiple of the desired length of the tube pieces, and means operable between incremental feeding steps to energize the shearing mechanism to shear said tubing in planes spaced longitudinally thereof simultaneously to cut from the leading end of the tubing a plurality of tube pieces of the desired length in a single shearing operation, said shearing mechanism including shearing elements arranged to operate in shearing planes which are in a non-parallel relation.

2. Apparatus for cutting tubing into pieces of a desired length, including shearing mechanism, means for feeding a leading end of tubing to said shearing mechanism in incremental steps each corresponding in length to a multiple of the desired length of the tube pieces, and means operable between incremental feeding steps to energize the shearing mechanism to shear said tubing in planes spaced longitudinally thereof simultaneously to cut from the leading end of the tubing a plurality of tube pieces of the desired length in a single shearing operation, said shearing mechanism including a plurality of die means arranged to dispose in side by side relation, at least one of which die means is movable relative the others and defines shearing planes each of which is inclined to the longitudinal axis of the tubing to which said shearing mechanism is applied.

3. Apparatus for cutting tubing into pieces of a desired length, including shearing mechanism, means for feeding the tubing to said shearing mechanism in incremental steps each corresponding in length to a multiple of the desired length of the tube pieces, means operable between incremental feeding steps to energize the shearing mechanism to shear said tubing in planes spaced longitudinally of the tubing to produce a plurality of tube pieces of the desired length in a single shearing operation, said shearing mechanism including a plurality of die means which are coaxially arranged and have central apertures to commonly receive therethrough the tubing to be cut and said shearing mechanism further including a plurality of punches positioning within the tubing to be respectively concentric with one of said die means, said die means and said punches mutually defining therebetween said planes which are spaced longitudinally of the tubing, a portion of said die means being movable and the remainder thereof being relatively fixed, a portion of said punch means positioned within and concentrically of said movable die means being movable therewith under the influence of the movement thereof, and said means to energize the shearing mechanism providing for the reciprocable movement of said movable die means to produce a shearing of said tubing simultaneously in each of a plurality of said spaced planes.

4. Apparatus for cutting tubing into pieces of a desired length, including means for feeding tubing in incremental steps each corresponding in length to a multiple of the desired length of the tube pieces, shearing mechanism to which the tubing is fed, said shearing mechanism including a relatively fixed frame having a through opening, a slide member in said through opening mounting for reciprocation in said frame, die means carried by and projecting from relatively opposite faces of said slide member, said die means providing longitudinally spaced outwardly facing cutting surfaces inclined to the longitudinal axis of said die means, relatively stationary die means incorporated in said frame each having a cutting surface in opposing complementary relation to a respective cutting surface on said die means carried by said slide member, the arrangement providing pairs of opposed relatively longitudinally spaced cutting surfaces arranged so that on movement of said slide member the cutting surfaces of the die means carried thereby move in closely adjacent almost contacting relation to the opposed cutting surfaces of said stationary die means, the tubing to be cut being received in said shearing mechanism in a position wherein it is surrounded by said stationary die means and said die means carried by said slide, means being provided to reciprocate said slide member and in a single stroke thereof to shear the tubing in longitudinally spaced planes respectively defined by said opposed cutting surfaces to produce a plurality of tube pieces of the desired length in a single shearing operation, and punch means positioning within the tubing a portion of which is displaceable with respect to the remainder thereof, said displaceable portion of said punch means being positioned within a portion of the tubing surrounded by the die means carried by said slide member and responding to a reciprocating motion of said slide member to accommodate the shearing stroke thereof.

5. Apparatus according to claim 4 wherein the punch means provided in said tubing include separate punch elements having means keying them against rotary motion relative to one another while permitting limited lateral shifting motion of one thereof relative the others, said punch element capable of lateral shifting motion providing that portion of the punch means which positions within the tubing to be surrounded by the die means carried by said slide member.

6. Apparatus as in claim 5 wherein said punch elements are in end abutting relation and the abutting ends thereof define planes which correspond to the planes of the opposed cutting surfaces of said die means.

7. Apparatus for cutting tubing into pieces of a desired length, including means for feeding tubing in incremental steps each corresponding in length to a multiple of the desired length of the tube pieces, a shearing mechanism to which the tubing is fed, said shearing mechanism including cutting dies a portion of which are movable and portions of which are relatively fixed as to their position for shearing operations, said movable portion of said cutting dies being positioned intermediately of cutting dies representing the fixed portions thereof and defining between adjacent ends thereof longitudinally spaced planes in which the tubing is sheared, a portion of said cutting dies comprising a series of coaxially related punch elements positioning within the tubing, each of the punch elements being located to lie within and to form a part of one of the portion of the remainder of the cutting dies which position about and in concentric closely spaced relation to tubing fed thereto by said feeding means in preparation for a shearing operation, restrictor means being provided to position within the tubing and in frictional engagement therewith at one end of the said series of punch elements placed within the tubing and an ejector rod positioning at the other end of said series cooperating with said restrictor means to effect a correct positioning of said series of punch elements, said restrictor means and said ejector rod being arranged to key to the remote ends of said series of coaxially related punch elements to interrelate therewith and to assist in preventing the relative rotation thereof.

8. Apparatus according to claim 7 wherein said ejector rod is mounted for reciprocating movement with respect to said series of punch elements at the end of the punch elements opposite to that from which the tubing is applied to said cutting dies, said ejector means being arranged to have pieces sheared from the tubing move thereon in response to an advancement of the tubing to be sheared through said cutting dies, between said punch elements and said portion of said cutting dies which position outwardly thereof for a shearing operation, and means are provided for sheared pieces on said ejector rod to be stripped therefrom as the ejector rod is retracted from said series of punch elements and said ejector rod has in association therewith means inhibiting a following movement of any portion of said series of punch elements upon retraction thereof.

9. Apparatus for cutting tubing into pieces of a desired length, including means for feeding tubing in incremental steps each corresponding in length to a multiple of the desired length of the tube pieces, a shearing mechanism to which the tubing is fed, said shearing mechanism including cutting dies portions of which are stationary and an intermediately positioning portion of which is relatively movable, adjacent ends of said cutting dies providing opposed almost contacting cutting surfaces which define longitudinally spaced planes in which the tubing is sheared, a portion of said cutting dies comprising a longitudinally extending series of punch elements in end to end relation, said punch elements positioning within the remainder of said cutting dies and defining therewith an annular passage accommodating the introduction therein of the tubing to be sheared and the projection therefrom of the pieces of tubing resulting from a shearing operation, in response to an advancement of the tubing to be sheared, said cutting dies having in connection with the movable portion thereof exterior to the tubing a slide member, said slide member being operable to shift said movable portion of said cutting dies laterally with respect to the tubing to shear said tubing in said longitudinally spaced planes, operating means for said slide member providing means for a reverse movement thereof to produce an overtravel of its originally set position and means to restore said slide member to its originally set position to provide a setting for the advancement of tubing to eject the sheared tubing from said cutting dies.

10. Apparatus according to claim 9 wherein said punch elements include a stationary portion and a relatively movable portion, said movable portion accommodating the movement of said slide member to produce the shearing of said tubing and the return thereof to its original position for ejection.

11. Apparatus as in claim 10 wherein said cutting dies including said punch members define longitudinally spaced pairs of cutting surfaces forming cutting planes adjacent of which are inclined to each other and in opposite directions.

12. Apparatus according to claim 11 wherein said means for operating said slide member provides for a shearing operation in a single stroke of said slide member in a substantially straight line path.

13. Apparatus for cutting tubing into pieces of a desired length, including shearing mechanism, means for feeding a leading end of tubing to said shearing mechanism in incremental steps each corresponding in length to a multiple of the desired length of the tube pieces, and means operable between incremental feeding steps to energize the shearing mechanism to shear said tubing in planes spaced longitudinally thereof simultaneously to cut from the leading end of the tubing a plurality of tube pieces of the desired length in a single shearing operation, said shearing mechanism including longitudinally spaced stationary die means and an intermediately positioning relatively transversely movable die means, said die means accommodating the projection therethrough of a leading end of said tubing, said stationary die means and said movable die means providing said longitudinally spaced apart shearing planes, said shearing planes being in a non-parallel relation, and punch means within portions of the tubing surrounded by said die means, including a punch element within a portion of the tubing surrounded by said movable die means keyed to other end related punch elements within portions of the tubing surrounded by said stationary die means to prevent relative rotary motion of the first said punch element while permitting limited relative bodily shifting motion thereof with transverse movement of said movable die means.

14. Apparatus according to claim 13, wherein means are provided effecting shearing and return strokes of said transversely movable die means, said stroke effecting means accomplishing an overtravel of said movable die means in a return stroke thereof insuring an accurate alignment of cut tube pieces for proper ejection from the shearing mechanism as a part of an operation by which a new length of tubing is fed into said shearing mechanism, and means for restoring said movable die means from an overtravel position prior to the start of a next succeeding shearing stroke.

15. Apparatus according to claim 13, wherein the first said punch element has a bias formation at each of its opposite ends which formations are in a non-parallel relation and wherein adjacent respective ends of said other end related punch elements have complementary bias formations, adjacent complementary ends of said punch elements positioning in planes approximately coincident with longitudinally spaced apart shearing planes defined by opposing cutting surfaces of said die means.

16. Apparatus for cutting tubing into pieces of a desired length, including a shearing mechanism providing relatively stationary and movable die means, said die means having tubing accommodating through openings with shearing being effected by lateral bodily shifting motion of said movable die means relative to said stationary die means in the presence of an accommodated length of tubing in said mechanism, said movable die means having an original position in which openings in said stationary and movable die means are substantially aligned for introduction of uncut tubing in said mechanism and for ejection of cut pieces, means for effecting shearing and return strokes of said movable die means the latter of which includes a travel of said movable die means to and beyond its said original position, and means for restoring said movable die means from an overtravel position to its said original position prior to the start of a next succeeding shearing stroke, said stationary die means including longitudinally spaced apart die members and said means for effecting shearing and return strokes of said movable die means being a reciprocable means positioning between said die members, said movable die means including cutting dies mounted in a back to back relation on said reciprocable means and in a facing relation to respective die members, openings in said die members and in said cutting dies accommodating the projection of tubing therethrough with a tolerance for tubing diameter, the overtravel movement of said reciprocable means achieving an alignment of cut and uncut tubing despite lost motion as may result from said tolerance, and punch means received in said tubing and including a punch element bridging the openings in said cutting dies and carried with said reciprocable means in its shearing and cutting strokes, and means utilizing adjacent end related punch elements within openings in said die members to maintain a relatively aligned relation of the first said punch element to said end related punch elements except for motion as defined by said reciprocable means.

17. Apparatus for cutting tubing into pieces of a desired length, including shearing mechanism, means for feeding a leading end of tubing to said shearing mechanism in incremental steps each corresponding in length to a multiple of the desired length of the tube pieces, means operable between incremental feeding steps to energize the shearing mechanism to shear said tubing in planes spaced longitudinally thereof simultaneously to cut from the leading end of the tubing a plurality of tube pieces of the desired length in a single shearing operation, ejector means constructed and arranged to provide for the pieces cut in a shearing operation to be ejected from the shearing mechanism by a new leading end of the tubing in conjunction with an operation of said feeding means, said shearing mechanism including a plurality of longitudinally positioning die means having central apertures to commonly receive therethrough the tubing to be cut and including a plurality of punches positioned within and concentrically of respective die means within tubing accommodated in said central apertures of said die means, an intermediately positioning die means and associated punch being movable relative to end related die means and their associated punches to effect a shearing operation in planes spaced longitudinally of the tubing.

* * * * *